(12) United States Patent
Zhou et al.

(10) Patent No.: US 12,120,541 B2
(45) Date of Patent: Oct. 15, 2024

(54) METHOD FOR PROCESSING COMMUNICATION RANGE INFORMATION AND TERMINAL

(71) Applicant: VIVO MOBILE COMMUNICATION CO., LTD., Guangdong (CN)

(72) Inventors: Jianping Zhou, Chang'an Dongguan (CN); Xiaodong Yang, Chang'an Dongguan (CN); Qian Zheng, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 99 days.

(21) Appl. No.: 17/037,215

(22) Filed: Sep. 29, 2020

(65) Prior Publication Data

US 2021/0014716 A1    Jan. 14, 2021

Related U.S. Application Data

(63) Continuation of application No. PCT/CN2019/078634, filed on Mar. 19, 2019.

(30) Foreign Application Priority Data

Mar. 29, 2018 (CN) .......................... 201810270748.1

(51) Int. Cl.
*H04W 24/10* (2009.01)
*H04W 4/021* (2018.01)
*H04W 28/02* (2009.01)

(52) U.S. Cl.
CPC ........... *H04W 24/10* (2013.01); *H04W 4/021* (2013.01); *H04W 28/0278* (2013.01)

(58) Field of Classification Search
CPC . H04W 24/10; H04W 4/021; H04W 28/0278; H04W 4/023; H04W 4/40; H04W 4/46; H04W 76/10; H04W 76/27; H04W 28/0226; H04W 76/14; H04L 69/321
See application file for complete search history.

(56) References Cited

U.S. PATENT DOCUMENTS

| | | | |
|---|---|---|---|
| 9,942,898 B2 * | 4/2018 | Dinan | H04W 72/1294 |
| 10,492,235 B2 * | 11/2019 | Han | H04W 72/1278 |
| 10,548,103 B2 * | 1/2020 | Yasukawa | H04W 92/18 |
| 10,602,495 B2 * | 3/2020 | Yi | H04W 72/14 |

(Continued)

FOREIGN PATENT DOCUMENTS

| | | | |
|---|---|---|---|
| CN | 105282688 A | 1/2016 | |
| CN | 106211089 A | 12/2016 | |

(Continued)

OTHER PUBLICATIONS

CN Office Action in Application No. 201810279748.1 dated Apr. 9, 2020.

(Continued)

*Primary Examiner* — Mounir Moutaouakil
(74) *Attorney, Agent, or Firm* — Brooks Kushman P.C.

(57) ABSTRACT

A method for processing communication range information and a terminal are provided. The method includes: receiving the communication range information of a service data unit from an application layer; determining target information according to the communication range information; and transmitting the target information to a base station.

20 Claims, 4 Drawing Sheets

```
┌──────────────────────────────────────────────────┐
│ receiving communication range information of a  │
│ service data unit from an application layer, and │──31
│ transmitting the communication range information │
│ of the service data unit to an access layer      │
└──────────────────────────────────────────────────┘
                        ↓
┌──────────────────────────────────────────────────┐
│ generating a mapping relationship between the    │
│ communication range information and a logical    │──32
│ channel group or a destination address           │
│ according to the communication range             │
│ information, and determining the mapping         │
│ relationship as the target information           │
└──────────────────────────────────────────────────┘
                        ↓
┌──────────────────────────────────────────────────┐
│ transmitting the mapping relationship to a base  │──33
│ station                                          │
└──────────────────────────────────────────────────┘
```

(56) References Cited

U.S. PATENT DOCUMENTS

| | | | |
|---|---|---|---|
| 10,716,134 B2 * | 7/2020 | Gulati | H04W 72/1284 |
| 10,932,288 B2 * | 2/2021 | Belleschi | H04W 28/0268 |
| 10,945,154 B2 * | 3/2021 | Yi | H04W 28/0278 |
| 11,122,402 B2 * | 9/2021 | Lee | H04W 4/50 |
| 11,122,542 B2 * | 9/2021 | Kim | H04L 5/0069 |
| 2013/0329651 A1 | 12/2013 | Lee et al. | |
| 2017/0048745 A1 * | 2/2017 | Yi | H04W 28/0278 |
| 2017/0295248 A1 * | 10/2017 | Fujishiro | H04L 67/16 |
| 2017/0367133 A1 * | 12/2017 | Park | H04W 72/04 |
| 2018/0159935 A1 * | 6/2018 | Cavalcanti | H04W 4/40 |
| 2019/0159084 A1 * | 5/2019 | Wu | H04W 4/40 |
| 2019/0246385 A1 * | 8/2019 | Lin | H04L 5/003 |
| 2020/0374744 A1 * | 11/2020 | Liu | H04W 72/1284 |

FOREIGN PATENT DOCUMENTS

| | | | |
|---|---|---|---|
| CN | 107105450 A | 8/2017 | |
| CN | 107182030 A | 9/2017 | |
| CN | 107295466 A | 10/2017 | |
| CN | 107347215 A | 11/2017 | |
| EP | 3 131 364 A1 | 2/2017 | |
| EP | 3 200 554 A1 | 8/2017 | |
| EP | 3430834 B1 * | 10/2021 | H04L 47/2475 |
| JP | 2013258678 A | 12/2013 | |
| KR | 20180023034 A | 3/2018 | |
| KR | 20200099904 A * | 2/2019 | H04W 4/50 |
| WO | 2015133179 A1 | 9/2015 | |
| WO | 2016/015764 A1 | 2/2016 | |
| WO | WO-2018084796 A1 * | 5/2018 | H04B 7/15 |
| WO | WO-2018182286 A1 * | 10/2018 | H04W 36/03 |

OTHER PUBLICATIONS

Written Opinion and International Search Report in Application No. PCT/CN2019/078634 dated Oct. 8, 2020.

"3rd Generation Partnership Project; Technical Specification Group Services and System Aspects; Study on architecture enhancements for EPS and 5G System to support advanced V2X services (Release 16)", 3GPP TR 23.786 V0.4.0 (Mar. 2018).

EP Search Report in Application No. 19776086.1 dated Mar. 31, 2021.

"Discussion on mode 3 resource allocation in PC5 CA" 3GPP TSG-RAN WG2 Meeting #101, R2-1801960, ZTE Corporation, Feb. 26, 2018.

"V2X sidelink transmission procedure considering packet duplication" 3GPP TSG-RAN2#101, R2-1802696, LG Electronics Inc., Feb. 26, 2018.

JP Office Action in Application No. 2020-552720 dated Nov. 29, 2021.

KR Office Action in Application No. 10-2020-7031300 dated Nov. 2, 2021.

CN Office Action in Application No. 201810270748.1 dated Apr. 9, 2020.

* cited by examiner

METHOD FOR PROCESSING COMMUNICATION RANGE INFORMATION AND TERMINAL

CROSS-REFERENCE TO RELATED APPLICATIONS

The present application is a continuation of PCT Application No. PCT/CN2019/078634 filed on Mar. 19, 2019, which claims a priority to Chinese Patent Application No. 201810270748.1 filed in China on Mar. 29, 2018, the disclosure of which is incorporated herein by reference in its entirety.

TECHNICAL FIELD

The present disclosure relates to the field of communications technology, and in particular to a method and terminal for processing communication range information.

BACKGROUND

In a Fifth-Generation (5G) network, there will be a large number of devices that can communicate directly with each other. Based on a characteristic of message transmission of a terminal or a user equipment (User Equipment, UE) that supports a vehicle to everything, (Vehicle to Everything, V2X) application, two UEs that supports a V2X service are controlled to have a communication range with sufficient response time. Related protocols describe performance requirements for different enhanced V2X (eV2X) use cases, such as platooning (platooning), advanced driving (advanced driving), extended sensors (Extended Sensors), and remote driving (Remote Driving).

Among performance requirements of the platooning, with regard to a requirement of latency (Max end-to-end latency), R14 (LTE R14 version) is mainly reflected by ProSe per-packet priority (ProSe Per-Packet Priority, PPPP). During a process of a ProSe upper layer (for example, above PC5 access stratum, an application layer above an access layer) of the terminal transmitting a data packet to a lower layer (PC5 access stratum, the access layer), the ProSe upper layer will provide a PPPP value for each service data unit (Service Data Unit, SDU). The PPPP can be divided into 8 groups at most, with values ranging from 0 to 7. The smaller the PPPP value, the higher data packet delay requirement, and the higher transmission priority. One data packet can correspond to one PPPP.

As shown in FIG. 1, the access layer includes: a packet data convergence protocol (Packet Data Convergence Protocol, PDCP), radio link control (Radio Link Control, RLC), medium access control (Medium Access Control, MAC) and a physical layer (PHY); if there are multiple logical channels between the MAC layer and the RLC (a logical channel ID is represented by LCH ID, and a logical channel group is represented by LCG ID), the logical channel and the PPPP may be mapped. The PPPP transmitting the SDU is equal to a logical channel priority (logical channel priority) associated with the logical channel in the MAC layer.

In R15 (LTE R15 version), with regard to reliability (Reliability), in the application layer, ProSe per-packet reliability (ProSe Per-Packet Reliability, PPPR) is introduced as an identifier of reliability requirements for each V2X SDU to the lower layer. If the V2X SDU transmitted from the application layer does not carry an identifier of the PPPR, it indicates that the SDU has no reliability requirements. Further, mapping between the PPPR and reliability of the V2X SDU configured by the application layer for a sidelink UE (a link of direct communication between the terminals is called sidelink, and the sidelink UE is a sidelink terminal) is similar to PPPP mechanism.

In the related art, a same service has different PPPP, PPPR and different communication range requirements for different SDUs.

However, from the above analysis, it can be known that the Max end-to-end latency is associated with the PPPP, and the reliability is associated with the PPPR, but there is no relevant description for the communication range requirements of different SDUs, which cannot meet transmission requirements of the SDU.

SUMMARY

The embodiments of the present disclosure provide a method and for processing communication range information and a terminal, so as to solve a problem in the related art that communication range requirements of different service data units are not specified and cannot meet transmission requirements of the service data units.

In a first aspect, the embodiments of the present disclosure provide a method for processing communication range information, including: receiving the communication range information of a service data unit from an application layer; determining target information according to the communication range information; transmitting the target information to a base station.

In a second aspect, the embodiments of the present disclosure also provide a terminal, including: a receiving module, used to receive communication range information of a service data unit from an application layer; a processing module, used to determine target information according to the communication range information; a transmitting module, used to transmit the target information to a base station.

In a third aspect, the embodiments of the present disclosure also provide a terminal, including a processor, a memory, and a computer program stored in the memory and capable of being executed by the processor, wherein the processor is used to execute the computer program to implement the steps of the method for processing the communication range information as described above.

In a fourth aspect, the embodiments of the present disclosure provide a computer-readable storage medium storing therein a computer program, wherein the computer program is used to be executed by a processor to implement the steps of the method for processing the communication range information as described above.

In this way, the terminal of the embodiments of the present disclosure receives the communication range information of the service data unit from the application layer, so that the access layer may implement transmission according to the communication range requirements of different service data units, and meet the transmission requirements of the service data unit.

BRIEF DESCRIPTION OF THE DRAWINGS

In order to illustrate technical solutions of the embodiments of the present disclosure more clearly, the drawings that need to be used in the description of the embodiments of the present disclosure will be briefly introduced below. Obviously, the drawings in the following description are only some embodiments of the present disclosure. For a person skilled in the art, other drawings can be obtained according to these drawings without any creative effort.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth herein. On the contrary, these embodiments are provided to enable a more thorough understanding of the present disclosure and can convey the scope of the present disclosure to a person skilled in the art in a complete manner.

The terms "first", "second", and the like in the specification and claims of the present application are used to distinguish similar objects, and are not necessarily used to describe a specific order or sequence. It should be understood that data used in this way can be interchanged under appropriate circumstances, so that the embodiments of the present application described herein, for example, can be implemented in a sequence other than those illustrated or described herein. In addition, the term "including" and "having" and any variants thereof are intended to cover non-exclusive inclusions, for example, processes, methods, systems, products, or devices that include a series of steps or units need not be limited to those steps or units that are explicitly listed, but may include other steps or units that are not explicitly listed or that are inherent to these processes, methods, products, or devices. "one of A, B, and C" and "A, B or C" are intended to include any one of A, B, and C.

Figure 2:
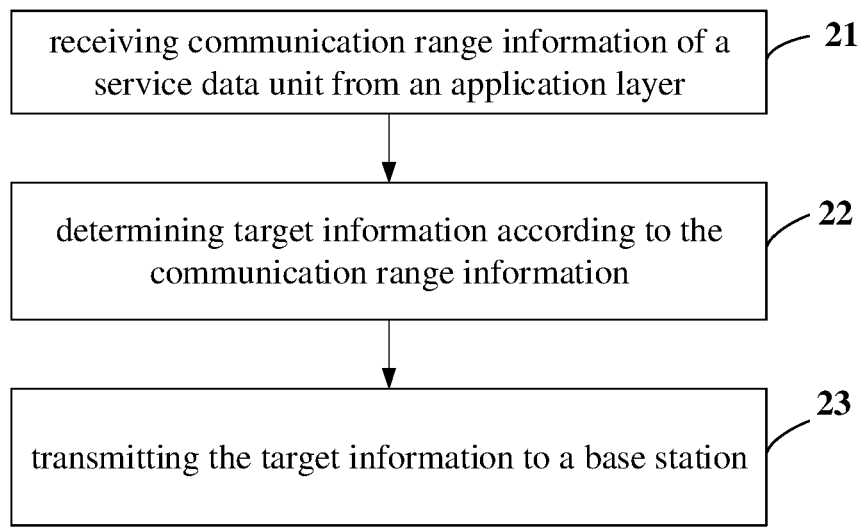
FIG. 2 shows a schematic flowchart of a method for processing communication range information according to an embodiment of the present disclosure.

As shown in FIG. 2, an embodiment of the present disclosure provides a method for processing communication range information, including: a step 21 of receiving the communication range information of a service data unit from an application layer; a step 22 of determining target information according to the communication range information; a step 23 of transmitting the target information to a base station.

Figure 1:
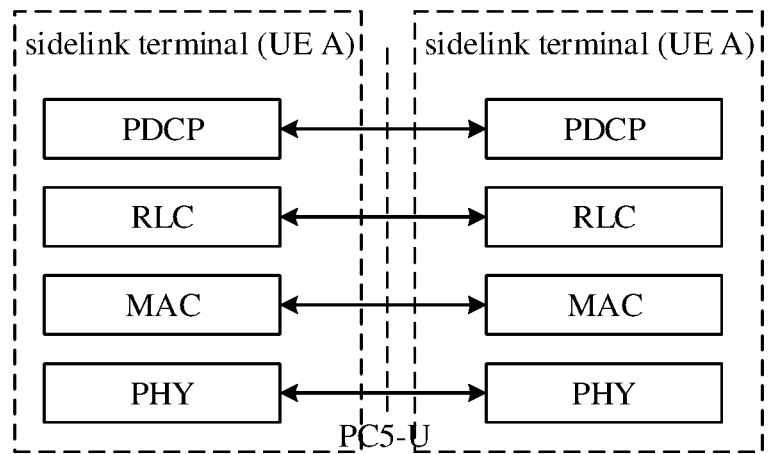
FIG. 1 shows a schematic diagram of an access layer of a terminal.

In this embodiment, an application layer of a sidelink terminal (sidelink UE) obtains communication range information for an SDU, and can transmit the communication range information to an access layer. As shown in FIG. 1, the access layer herein may include PDCP, RLC, MAC and PHY.

In this embodiment, the communication range information includes at least one of: at least two different levels of communication distance requirement information; minimum communication distance requirement information; maximum communication distance requirement information; communication distance range requirement information.

Specifically, the application layer of the sidelink UE pushes one or more pieces of communication range information to the access layer. The communication range information herein can be represented by a communication range identifier PPP-CR, and each identifier reflects requirements of each SDU on communication distance.

The PPP-CR identifier herein can indicate communication distance requirements for (at least two) different levels of one service data unit (SDU). For example, for an SDU, {high, low} or {high, medium, low} is defined; when the PPP-CR of the SDU herein is high, it means that level of the communication distance requirement of the SDU is high; when the PPP-CR of the SDU herein is low, it means the level of the communication distance requirement of the SDU is low; when the PPP-CR of the SDU herein is medium, it means that the level of the communication distance requirement of the SDU is between high and low.

The PPP-CR identifier herein may indicate the minimum communication distance requirement for an SDU; for example, for an SDU, the PPP-CR is defined as being greater than or equal to a threshold 1, which indicates that the minimum communication distance is the threshold 1.

The PPP-CR identifier herein may indicate the maximum communication distance requirement for an SDU; for example, for an SDU, the PPP-CR is defined as being less than or equal to a threshold 2, which indicates that the maximum communication distance is the threshold 2.

The PPP-CR identifier herein can indicate range requirements for the communication distance of an SDU; for example, for an SDU, the PPP-CR is defined as being greater than or equal to a threshold 3, and the PPP-CR is defined as being less than or equal to a threshold 4, which indicates that the communication distance of the SDU is greater than or equal to the threshold 3, and less than or equal to the threshold 4.

Naturally, the above-mentioned various communication range requirement information can also be used in combination in part or in whole. Specifically, an index can be defined for the PPP-CR identifier of the SDU. For example: an index of the PPP-CR=1, which indicates the communication range requirement is that the level of the communication distance requirement is high; the index of the PPP-CR=2, which indicates the communication range requirement is that the level of the communication distance requirement is medium; the index of the PPP-CR=3, which indicates the communication range requirement is that the level of the communication distance requirement is low; the index of the PPP-CR=4, which indicates the communication range requirement is that the minimum communication distance is threshold 1; the index of the PPP-CR=5, which indicates the communication range requirement is that the maximum communication distance is threshold 2; the index of the PPP-CR=6, which indicates the communication range requirement is that the communication distance is greater than or equal to threshold 3, and less than or equal to threshold 4.

In this embodiment, the target information may include: transmission information associated with the communication range generated by the terminal according to the communication range information, wherein the transmission information at least carries binding relationship between the SDU and the communication range.

In the embodiments of the present disclosure, the terminal transmits the communication range information of the service data unit to the access layer, so that the access layer can perform transmission processing according to the communication range requirements of different SDUs, to meet the transmission requirement of the SDU.

Figure 3:
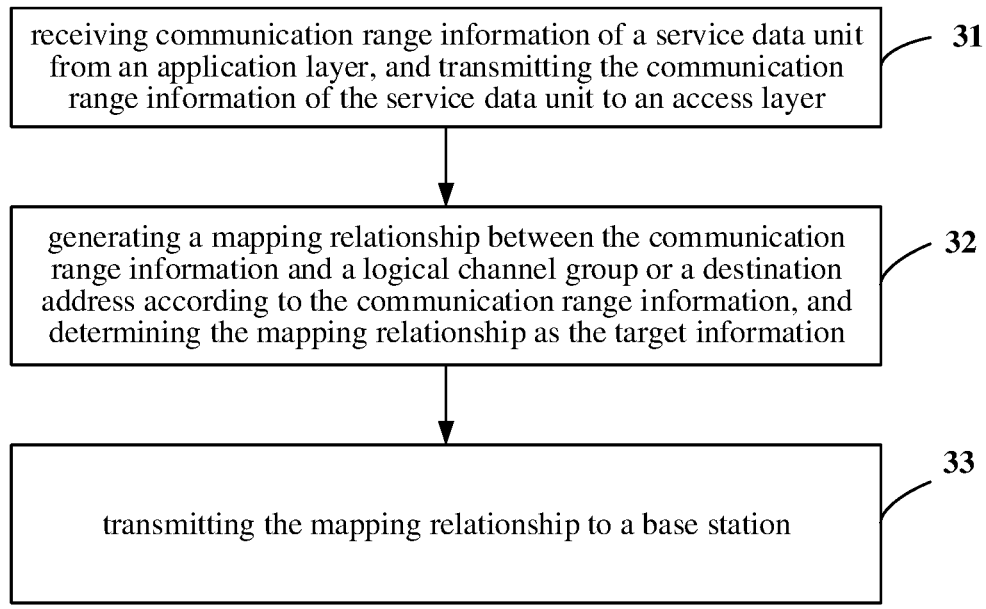
FIG. 3 shows another schematic flowchart of the method for processing the communication range information according to an embodiment of the present disclosure.

As shown in FIG. 3, an embodiment of the present disclosure provides a method for processing communication range information, including: a step 31 of receiving communication range information of an SDU from an application layer; a step 32 of generating a mapping relationship between the communication range information and a logical channel group or a destination address according to the communication range information, and determining the mapping relationship as the target information; a step 33 of transmitting the mapping relationship to the base station; in specific implementation, the mapping relationship may be transmitted to the base station through a Radio Resource Control (RRC) message.

In this embodiment, the sidelink terminal (sidelink UE) notifies the base station of the communication range information required by the SDU of the terminal through the RRC message. Specifically, it may notify the base station by transmitting sidelink terminal information (sidelink UE information), and the sidelink terminal information is carried in the RRC message.

When the sidelink UE notifies the base station of the communication range information required by the SDU of the terminal, the mapping relationship between the communication range information and the logical channel group or the destination address is generated at the access layer, which may specifically be a mapping list of an index of the communication range information (Communication range index) and a Logical Channel Group Identifier (LCG ID) or a Destination address Identifier (Destination ID), and notify the base station through the sidelink terminal information; the sidelink terminal information herein may be the abovementioned transmission information associated with the communication range, the sidelink terminal information carries a binding relationship between the SDU and the communication range, as well as a binding relationship between the communication range information and a logical channel group identifier or a destination address identifier.

Figure 4:
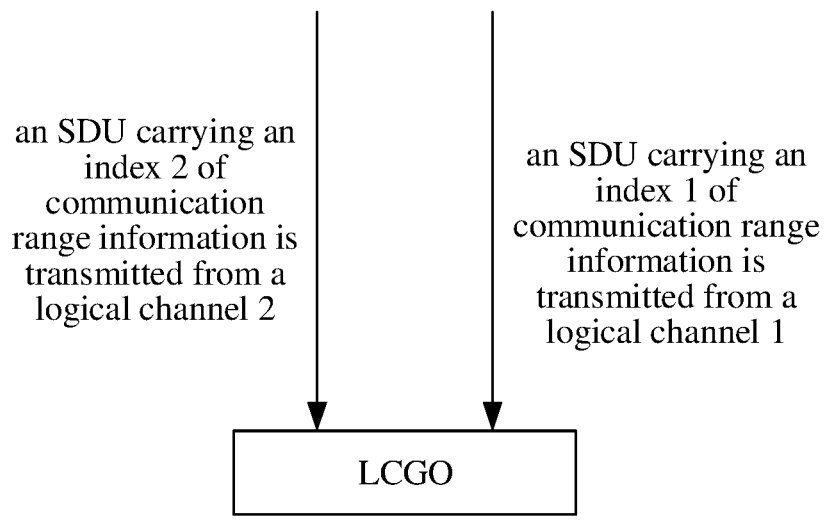
FIG. 4 shows a schematic diagram of a logical channel group identifier associated with one or more indexes of the communication range information in an embodiment of the present disclosure.

The mapping relationship between the communication range information and the logical channel group herein includes that one logical channel group is associated with one or more pieces of communication range information; specifically, one logical channel group identifier is associated with indexes of one or more pieces of communication range information, and indexes of the communication range information associated with different logical channel group identities may be same or different; As shown in FIG. 4, it is an example of one logical channel group identifier associated with the indexes of one or more pieces of communication range information. An SDU carrying an index 2 of the communication range information is transmitted from LCH 2, and an SDU carrying an index 1 of the communication range information is transmitted from LCH 1 and placed in the LCG 0.

The mapping relationship between the communication range information and the destination address herein includes that one destination address is associated with one or more pieces of communication range information. Specifically, one destination address identifier is associated with indexes of one or more communication range information, and indexes of the communication range information associated with different destination address identifiers may be same or different.

In this embodiment, the terminal can report the mapping relationship between the communication range information and the logical channel group to the base station, so that the base station can also obtain the communication range requirement of the SDU of the terminal, and further meet the transmission requirements of the SDU.

Figures 5, 6:
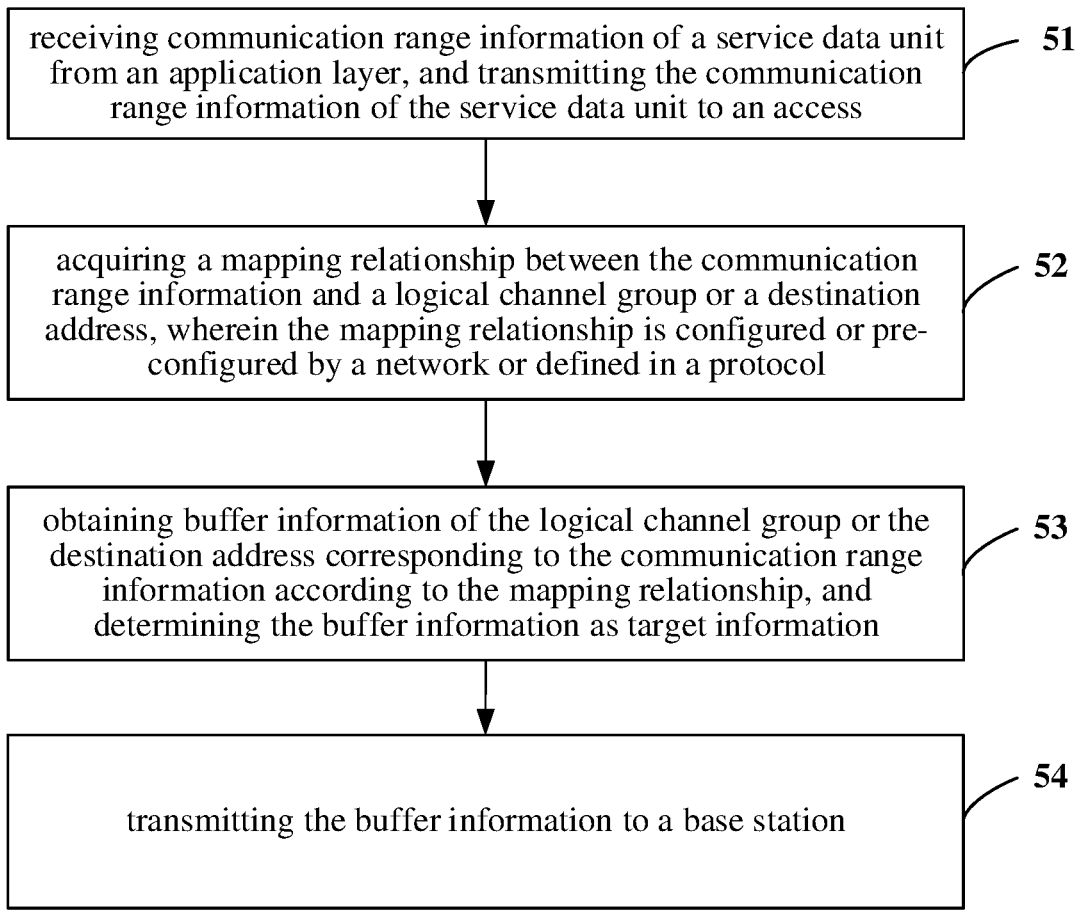
FIG. 5 shows still another schematic flowchart of the method for processing the communication range information according to an embodiment of the present disclosure.
FIG. 6 shows a schematic diagram of a data format of a sidelink buffer status report.

As shown in FIG. 5, an embodiment of the present disclosure provides a method for processing communication range information, including: a step 51 of receiving the communication range information of a service data unit from an application layer; a step 52 of acquiring a mapping relationship between the communication range information and a logical channel group or a destination address, wherein the mapping relationship is configured or pre-configured by a network or defined in a protocol; a step 53 of obtaining buffer information of the logical channel group or the destination address corresponding to the communication range information according to the mapping relationship, and determining the buffer information as the target information; a step 54 of transmitting the buffer information to the base station. Specifically, the buffer information may be transmitted to the base station through a sidelink Buffer Status Report (BSR) herein.

In this embodiment, the sidelink terminal (sidelink UE) firstly obtains the mapping relationship between the communication range information and the logical channel group or the destination address, which may specifically be a mapping list of an index of communication range information (communication range index) configured or pre-configured by a network or defined in a protocol and the Logical Channel Group Identifier (LCG ID) or the Destination Address Identifier (Destination ID);

The mapping relationship between the communication range information and the logical channel group herein includes that one logical channel group is associated with one or more pieces of communication range information; specifically, one logical channel group identifier is associated with indexes of one or more pieces of communication range information, and the indexes of communication range information associated with different logical channel group identities may be same or different. As shown in FIG. 4, it is an example of one logical channel group identifier associated with the indexes of one or more pieces of communication range information. An SDU carrying an index 2 of the communication range information is transmitted from a Logical Channel (LCH) 2, and an SDU carrying an index 1 of the communication range information is transmitted from a logical channel 1 and placed in the LCG 0.

The mapping relationship between the communication range information and the destination address herein includes that one destination address is associated with one or more pieces of communication range information. Specifically, one destination address identifier is associated with indexes of one or more communication range information, and indexes of the communication range information associated with different destination address identifiers may be same or different.

Further, at the access layer, the sidelink UE calculates buffer information of the LCG ID or Destination ID corresponding to the index of one or more pieces of communication range information according to data volume of the SDU to be transmitted associated with indexes of one or more pieces of communication range information, which may specifically be buffer size.

Further, at the access layer, the buffer information of the LCG ID or Destination ID corresponding to the indexes of one or more pieces of communication range information herein, as well as the mapping relationship between the communication range information and the logical channel group or the destination address, are reported to the base station through the sidelink Buffer Status Report (sidelink BSR).

The sidelink buffer status report herein may be the above-mentioned transmission information associated with the communication range. The sidelink buffer status report carries the binding relationship between the SDU and the communication range, as well as the communication range information and the logical channel group identifier or the destination address identifier. Specifically, as shown in FIG. 6, data format of the sidelink BSR includes the LCG ID or the Destination ID (i.e., Destination Index) corresponding to the indexes of one or more pieces of communication range information bound to the SDU and a buffer size corresponding to the LCG ID or the Destination ID respectively.

In this embodiment, the terminal can obtain the mapping relationship between the pre-configured communication range information and the logical channel group, apply this mapping relationship in the access layer, and finally report the result of the mapping relationship in the access layer (that is, the buffer information of the LCG ID or Destination ID corresponding to the indexes of one or more communication range information of the SDU to be transmitted) to the base station, so that the base station can also obtain the communication range requirements of the SDU of the terminal, and further meet the transmission requirements of the SDU.

In the above-mentioned embodiments of the present disclosure, a more detailed distinction of communication range (Communication distance) requirements is given for different service data units within a same service, that is, even for one service, there are different communication range information for different service data units. The application layer pushes the identifier associated with the communication range information to the access layer, and this identifier reflects the requirement of the service data unit for the communication distance; and further, when the base station needs to know this requirement, the sidelink UE explicitly informs the base station of the communication range requirements of its own application layer through sidelink UE information; or the sidelink UE implicitly informs the base station of the communication range requirements of its own application layer. For example, the mapping relationship between the communication range information and the LCG ID or the destination address can be configured or pre-configured by a network or pre-defined by a protocol. Furthermore, the sidelink UE reports to the base station through the sidelink BSR, so that the base station can also obtain this type of requirement and meet the transmission requirements of the SDU.

Figure 7:
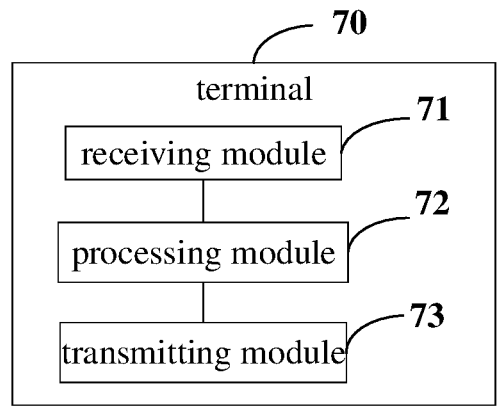
FIG. 7 shows a schematic diagram of a module structure of a terminal according to an embodiment of the present disclosure.

As shown in FIG. 7, the terminal 70 of the embodiments of the present disclosure can implement details of the method for processing communication range information in the above embodiment and achieve a same effect. The terminal 70 further includes the following functional modules: a receiving module 71, used to receive communication range information of a service data unit from an application layer; a processing module 72, used to determine target information according to the communication range information; a transmitting module 73, used to transmit the target information to a base station.

The communication range information includes at least one of: at least two different levels of communication distance requirement information; minimum communication distance requirement information; maximum communication distance requirement information; communication distance range requirement information.

In an embodiment of the terminal, the processing module 72 is further used to: generate a mapping relationship between the communication range information and a logical channel group or a destination address according to the communication range information, and determine the mapping relationship as the target information; the transmitting module 73 is further used to: transmit the mapping relationship to the base station through a Radio Resource Control (RRC) message.

In an embodiment of the terminal, the processing module 72 is further used to: acquire a mapping relationship between the communication range information and a logical channel group or a destination address, wherein the mapping relationship is configured or pre-configured by a network or defined in a protocol; obtain buffer information of the logical channel group or the destination address corresponding to the communication range information according to the mapping relationship, and determine the buffer information as the target information; when the transmitting module 73 transmits the buffer information to the base station, the transmitting module 73 may transmit the buffer information to the base station through the sidelink buffer status report.

In this embodiment, the mapping relationship between the communication range information and the logical channel group includes that one logical channel group is associated with one or more pieces of communication range information; the mapping relationship between the communication range information and the destination address includes that one destination address is associated with one or more pieces of communication range information.

It is worth noting that the terminal of the embodiments of the present disclosure gives a more detailed distinction of communication range requirements for different service data units within a same service, that is, even for one service, there are different communication range information for different service data units. The application layer pushes the identifier associated with the communication range information to the access layer, and this identifier reflects the requirement of the service data unit for the communication distance; and further, when the base station needs to know this requirement, the sidelink UE explicitly informs the base station of the communication range requirements of its own application layer through the sidelink UE information; or the sidelink UE implicitly informs the base station of the communication range requirements of its own application layer. For example, the mapping relationship between the communication range information and the LCG ID or the destination address can be configured or pre-configured by a network or defined by a protocol. Furthermore, the sidelink UE reports to the base station through the sidelink BSR, so that the base station can also obtain this type of requirement and meet the transmission requirements of the SDU.

Figure 8:
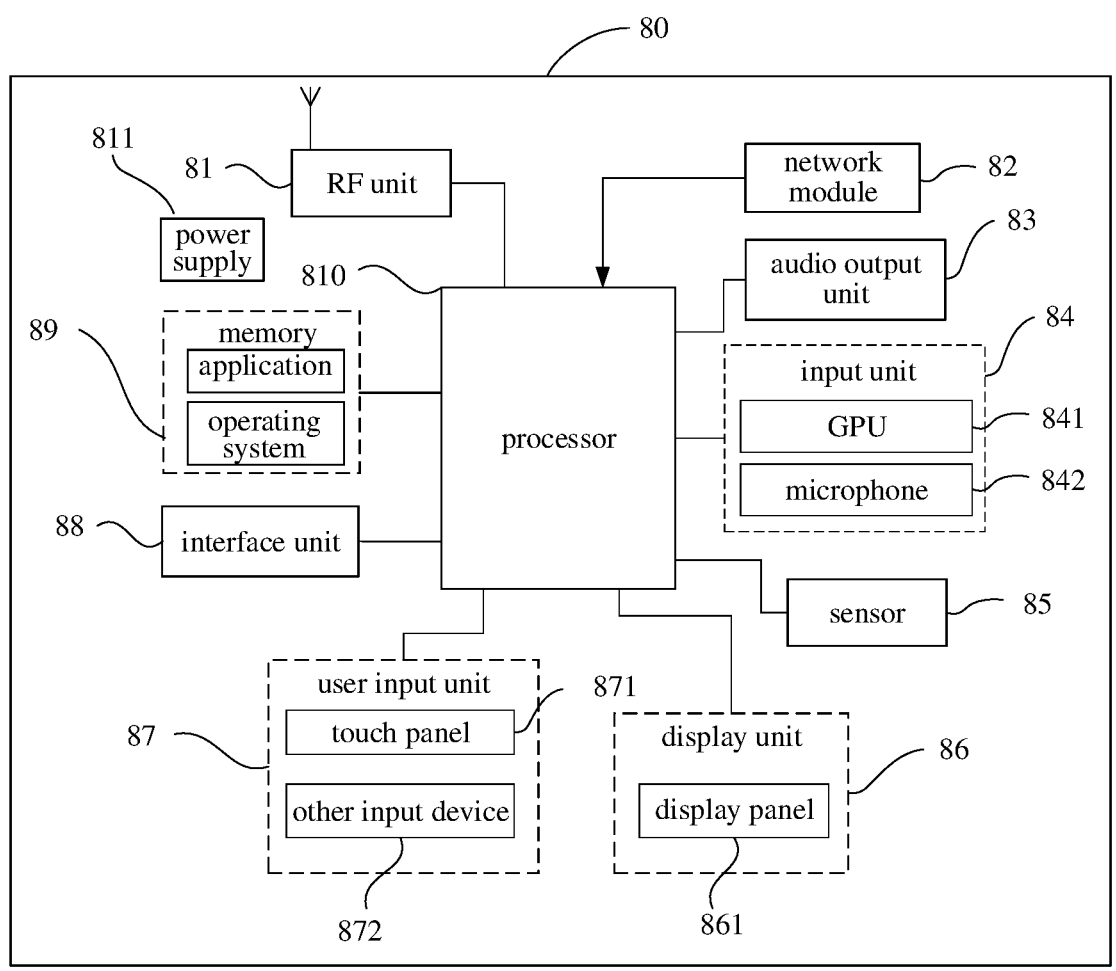
FIG. 8 shows a block diagram of a terminal according to an embodiment of the present disclosure.

In order to better achieve the above purpose, further, FIG. 8 is a schematic diagram of a hardware structure of a terminal 80 for implementing various embodiments of the present disclosure. The terminal 80 includes but is not limited to: a Radio Frequency (RF) unit 81, a network module 82, an audio output unit 83, an input unit 84, a sensor 85, a display unit 86, a user input unit 87, an interface unit 88, a memory 89, a processor 810, a power supply 811 and other components.

A person skilled in the art may understand that the terminal structure shown in FIG. 8 does not constitute a limitation on the terminal, and the terminal may include more or fewer components than those illustrated, or a combination of certain components, or a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, and the like.

The processor 810 is used to: receive the communication range information of the service data unit from the application layer; determine the target information according to the communication range information; the radio frequency unit 81 is used to transmit the target information to the base station.

Further, the processor 810 is used to: generate a mapping relationship between the communication range information and a logical channel group or a destination address, and determine the mapping relationship as the target information; the radio frequency unit 81 is used to transmit the mapping relationship to the base station; when the radio frequency unit 81 transmits the mapping relationship to the base station, the radio frequency unit 81 is specifically used to transmit the mapping relationship to the base station through a Radio Resource Control (RRC) message.

In an embodiment of the terminal, the processor 810 is further used to: acquire a mapping relationship between the communication range information and the logical channel group or the destination address, wherein the mapping relationship is configured or pre-configured by a network or defined in a protocol; obtain buffer information of the logical channel group or the destination address corresponding to the communication range information according to the mapping relationship, and determine the buffer information as the target information; the radio frequency unit 81 transmits the buffer information to the base station; when the radio frequency unit 81 transmits the buffer information to the base station, the radio frequency unit 81 may transmit the buffer information to the base station through the sidelink buffer status report.

It should be understood that, in the embodiments of the present disclosure, the radio frequency unit 81 may be used to receive and transmit a signal during a process of receiving and transmitting information or during a call. Specifically, after receiving downlink data from a base station, the downlink data is processed by the processor 810; in addition, uplink data is transmitted to the base station. Generally, the radio frequency unit 81 includes, but is not limited to, an antenna, at least one amplifier, a transceiver, a coupler, a low noise amplifier, a duplexer, and the like. In addition, the radio frequency unit 81 may also communicate with the network and other devices through a wireless communication system.

The terminal provides the user with wireless broadband Internet access through the network module 82, such as enabling the user to send or receive an e-mail, browse a web page, access streaming media, and the like.

The audio output unit 83 may convert audio data received by the radio frequency unit 81 or the network module 82 or stored in the memory 89 into an audio signal and output it as a sound. Moreover, the audio output unit 83 may also provide an audio output related to a specific function performed by the terminal 80 (for example, call signal reception sound, message reception sound, or the like). The audio output unit 83 includes a speaker, a buzzer, a receiver, and the like.

The input unit 84 is used to receive an audio or video signal. The input unit 84 may include a graphics processing unit (Graphics Processing Unit, GPU) 841 and a microphone 842, and the graphics processing unit 841 processes image data of a still picture or a video obtained by an image capturing device (such as a camera) in a video capturing mode or an image capturing mode. A processed image frame may be displayed on the display unit 86. The image frame processed by the graphics processing unit 841 may be stored in the memory 89 (or other storage medium) or transmitted via the radio frequency unit 81 or the network module 82. The microphone 842 may receive sound and process such sound into audio data. The processed audio data may be converted into a format that may be transmitted to a mobile communication base station via the radio frequency unit 81 in a case of a telephone call mode, and be outputted.

The terminal 80 also includes at least one sensor 85, such as a light sensor, a motion sensor, and other sensors. Specifically, the light sensor includes an ambient light sensor and a proximity sensor, wherein the ambient light sensor may adjust brightness of the display panel 861 according to brightness of ambient light, and the proximity sensor may turn off the display panel 861 and/or backlight when the terminal 80 is near an ear. As a type of motion sensor, an accelerometer sensor may detect magnitude of acceleration in various directions (generally in three axes), and may detect magnitude and direction of the gravity when the accelerometer sensor is still, and may be used to identify attitude of the terminal (such as horizontal and vertical screen switching, related games, magnetometer attitude calibration), vibration identification related functions (such as pedometer, tapping), etc.; the sensor 85 may also include a fingerprint sensor, a pressure sensor, an iris sensor, a molecular sensor, a gyroscope, a barometer, a hygrometer, a thermometer, an infrared sensor, and the like, and details thereof will not be described herein.

The display unit 86 is used to display information input by the user or provided to the user. The display unit 86 may include a display panel 861, which may be configured in a form of a liquid crystal display (Liquid Crystal Display, LCD), an organic light-emitting diode (Organic Light-Emitting Diode, OLED) display, etc.

The user input unit 87 may be used to receive numeric or character information being inputted, and generate a key signal input related to user settings and function control of the terminal. Specifically, the user input unit 87 includes a touch panel 871 and another input device 872. The touch panel 871, also known as a touch screen, may collect the touch operation of the user on or near it (such as the operation of the user on or near the touch panel 871 using any suitable object or accessory such as a finger, a stylus, etc.). The touch panel 871 may include a touch detection device and a touch controller. The touch detection device detects an orientation of the touch of the user, and detects a signal brought by the touch operation, and transmits the signal to the touch controller; and the touch controller receives touch information from the touch detection device and converts it into contact coordinates, then transmits the contact coordinates to the processor 810, and receives a command transmitted by the processor 810 and executes the command In addition, the touch panel 871 may be implemented in various types, such as a resistive touch panel, a capacitive touch panel, an infrared touch panel, and a surface acoustic wave touch panel. In addition to the touch panel 871, the user input unit 87 may also include another input device 872. Specifically, the other input device 872 may include, but is not limited to, a physical keyboard, a function key (such as a volume control key, a switch key, etc.), a trackball, a mouse, a joystick, and details thereof will not be described herein.

Further, the touch panel 871 may cover the display panel 861. When the touch panel 871 detects the touch operation on or near it, the touch operation is transmitted to the processor 810 to determine a type of a touch event, and then the processor 810 provides a corresponding visual output on the display panel 861 according to the type of the touch event. Although in FIG. 8, the touch panel 871 and the display panel 861 serve as two independent components to implement input and output functions of the terminal, in some embodiments, the touch panel 871 and the display panel 861 may be integrated to implement the input and output functions of the terminal, which is not specifically limited herein.

The interface unit 88 is an interface for connecting an external device to the terminal 80. For example, the external device may include a wired or wireless headphone port, an external power (or battery charger) port, a wired or wireless data port, a memory card port, a port for connecting a device with an identification module, an audio Input/Output (I/O) port, a video I/O port, a headphone port, etc. The interface unit 88 may be used to receive an input (for example, data information, electric power, etc.) from the external device, and transmit the received input to one or more elements within the terminal 80 or may be used transmit data between the terminal 80 and the external device.

The memory 89 may be used to store a software program and various data. The memory 89 may mainly include a program storage region and a data storage region, wherein the program storage region may store an operating system, an application required by at least one function (such as a sound playback function, an image playback function, etc.), etc.; the data storage region may store data (such as audio data, a phone book, etc.) created according to the use of the mobile phone, etc. In addition, the memory 89 may include a high-speed random-access memory, and may also include a non-volatile memory, such as at least one disk storage device, a flash memory device, or another volatile solid-state storage device.

The processor 810 is a control center of the terminal, which uses various interfaces and lines to connect various parts of the entire terminal, runs or executes the software programs and/or modules stored in the memory 89, and calls the data stored in the memory 89, to execute various functions of the terminal and process data, thereby monitoring the terminal as a whole. The processor 810 may include one or more processing units; preferably, the processor 810 may integrate an application processor and a modem processor, wherein the application processor mainly processes an operating system, a user interface, an application, and the like, and the modem processor mainly processes wireless communication. It may be understood that the above modem processor may alternatively not be integrated into the processor 810.

The terminal 80 may also include the power supply 811 (such as a battery) that supplies power to various components. Preferably, the power supply 811 may be logically connected to the processor 810 through a power management system, thereby implementing functions such as charge management, discharge management, and power consumption management through the power management system.

In addition, the terminal 80 includes some functional modules not shown, and details thereof will not be described herein.

Preferably, as shown in FIG. 8 again, an embodiment of the present disclosure further provides a terminal, including a processor 810, a memory 89, a computer program stored on the memory 89 and executable on the processor 810, wherein the computer program is used to be executed by the processor 810 to implement various processes of the above method embodiment for processing the communication range information, and may achieve a same technical effect. In order to avoid repetition, details thereof will not be repeated herein. The terminal can be a wireless terminal or a wired terminal. The wireless terminal can be a device that provides voice and/or other service data connectivity to the user, a handheld device with a wireless connection function, or other processing device connected to a wireless modem. The wireless terminal can communicate with one or more core networks via a radio access network (Radio Access Network, RAN). The wireless terminal may be a mobile terminal, such as a mobile phone (also called "cellular" phone) and a computer with a mobile terminal. For example, it may be a portable, pocket-sized, handheld, computer built-in or vehicle-mounted mobile device, which exchanges language and/or data with the wireless access network. For example, it may be a personal communication service (Personal Communication Service, PCS) phone, a cordless phone, a session initiation protocol (Session Initiation Protocol, SIP) phone, a wireless local loop (Wireless Local Loop, WLL) station, and a personal digital assistant (Personal Digital Assistant, PDA), or the like. The wireless terminal can also be called a system, a subscriber unit (Subscriber Unit), a subscriber station (Subscriber Station), a mobile station (Mobile Station), a mobile (Mobile), a remote station (Remote Station), a remote terminal (Remote Terminal), an access terminal (Access Terminal), a user terminal (User Terminal), user agent (User Agent), a user device (User Device or User Equipment), which are not limited herein.

An embodiment of the present disclosure further provides a computer-readable storage medium, and a computer program is stored on the computer-readable storage medium. The computer program is configured to be executed by the processor, to implement each process of the above method embodiments for processing the communication range information, and may achieve the same technical effect. To avoid repetition, it is not repeated herein. The computer-readable storage medium is, for example, a read-only memory (Read-Only Memory, ROM), a random access memory (Random Access Memory, RAM), a magnetic disk or an optical disk.

A person skilled in the art may realize that the units and algorithm steps of each example described in combination with the embodiments disclosed herein may be implemented in electronic hardware, or a combination of computer software and electronic hardware. Whether these functions are performed in hardware or software depends on a specific application and design constraints of the technical solution. A person skilled in the art may implement the described functions in varying ways for each specific application, but such implementation should not be considered beyond the scope of the present disclosure.

A person skilled in the art may clearly understand that, for the convenience and brevity of description, the specific working processes of the systems, devices, and units described above may refer to the corresponding processes in the above method embodiments, which will not be repeated herein.

In the embodiments provided by the present application, it should be appreciated that the disclosed device and method may be implemented in other manners. For example, the device embodiments described above are merely illustrative. For example, division of the units is merely a logical function division. In actual implementation, there may be another division manner. For example, multiple units or components may be combined, or may be integrated into another system, or some features may be ignored or not executed. In addition, coupling or direct coupling or communication connection between the components shown or discussed may be indirect coupling or a communication connection through some interfaces, devices or units, and may be in electrical, mechanical or another form.

The units described as separate components may or may not be physically separated, and the components displayed as the units may or may not be physical units, that is, they may be located in one place or distributed to multiple network units. Some or all of the units may be selected according to actual needs to achieve objectives of the present disclosure.

In addition, different functional units in the different embodiments of the present disclosure may be integrated into one processing unit, or may physically exist separately, or two or more units may be integrated into one unit.

When the functions are implemented in a form of software functional units and sold or used as independent products, they may be stored in a computer-readable storage medium. Based on this understanding, the technical solution of the present disclosure essentially, or a part that contributes to the related art, or a part of the technical solution may be embodied in a form of a software product. The computer software product is stored in a storage medium and includes instructions for causing a computer device (for example, a personal computer, a server, or a network device) to perform all or part of the steps of the method described in various embodiments of the present disclosure. The above storage medium includes various media that can store program codes, such as a Universal Serial Bus (USB) flash disk, a mobile hard disk, a ROM, a RAM, a magnetic disk, an optical disk, or the like.

In addition, it should be noted that in the device and method of the present disclosure, obviously, components or steps can be decomposed and/or recombined. These decomposition and/or recombination should be regarded as equivalent solutions of the present disclosure. Moreover, the steps of performing the above series of processing can be performed naturally in an order of description in a chronological order, but they do not necessarily need to be performed in the chronological order, and some steps can be performed in parallel or independently of each other. A person skilled in the art can understand that all or any of the steps or components of the method and device of the present disclosure can be implemented in any computing device (including a processor, storage medium, etc.) or a network of computing devices in hardware, firmware, software, or a combination thereof, this can be achieved by a person skilled in the art using their basic programming skills after reading the description of the present disclosure.

Therefore, the purpose of the present disclosure can also be realized by running a program or a group of programs on any computing device. The computing device may be a well-known general-purpose device. Therefore, the purpose of the present disclosure can also be realized only by providing a program product containing program code for implementing the method or device. That is, such a program product also constitutes the present disclosure, and a storage medium storing such a program product also constitutes the present disclosure. Obviously, the storage medium may be any well-known storage medium or any storage medium to be developed in the future. It should be also noted that, in the device and method of the present disclosure, obviously, components or steps can be decomposed and/or recombined. These decomposition and/or recombination should be regarded as equivalent solutions of the present disclosure. Moreover, the steps of performing the above series of processing can be performed naturally in an order of description in a chronological order, but they do not necessarily need to be performed in a chronological order. Some steps can be performed in parallel or independently of each other.

The above are preferred embodiments of the present disclosure, and it should be noted that a person skilled in the art can make various improvements and modifications without departing from principles of the present disclosure, and these improvements and modifications are also within the protection scope of the present disclosure.

What is claimed is:

1. A method for processing communication range information, comprising:
   receiving the communication range information of a service data unit from an application layer of a sidelink user equipment;
   determining target information according to the communication range information;
   transmitting the target information to a base station,
   wherein the target information comprises a mapping relationship between the communication range information and a destination address, and the communication range information of the service data unit indicates requirement of the service data unit on a communication distance,
   wherein the communication range information comprises:
   at least two different levels of communication distance requirement information other than minimum communication distance requirement information and maximum communication distance requirement information.

2. The method for processing the communication range information according to claim 1, wherein the communication range information further comprises at least one of:
   the minimum communication distance requirement information;
   the maximum communication distance requirement information;
   communication distance range requirement information.

3. The method for processing the communication range information according to claim 1, wherein the step of determining the target information according to the communication range information comprises:
   generating the mapping relationship between the communication range information and the destination address according to the communication range information, and determining the mapping relationship as the target information.

4. The method for processing the communication range information according to claim 3, wherein the step of transmitting the target information to the base station comprises:
   transmitting the mapping relationship to the base station through a Radio Resource Control (RRC) message.

5. The method for processing the communication range information according to claim 1, wherein the step of determining the target information according to the communication range information comprises:
   acquiring the mapping relationship between the communication range information and the destination address, wherein the mapping relationship is configured or pre-configured by a network or defined in a protocol;

obtaining buffer information of the destination address corresponding to the communication range information according to the mapping relationship, and determining the buffer information as the target information.

6. The method for processing the communication range information according to claim 5, wherein the step of transmitting the target information to the base station comprises:

transmitting the buffer information to the base station through a sidelink buffer status report.

7. The method for processing the communication range information according to claim 3, wherein the mapping relationship between the communication range information and the destination address comprises that one destination address is associated with at least one piece of communication range information.

8. A terminal, comprising a processor, a memory, and a computer program stored in the memory and capable of being executed by the processor, wherein the processor is used to execute the computer program to implement steps of a method for processing communication range information comprising:

receiving the communication range information of a service data unit from an application layer of a sidelink user equipment;

determining target information according to the communication range information;

transmitting the target information to a base station, wherein the target information comprises a mapping relationship between the communication range information and a destination address, and the communication range information of the service data unit indicates requirement of the service data unit on a communication distance, wherein the communication range information comprises:

at least two different levels of communication distance requirement information other than minimum communication distance requirement information and maximum communication distance requirement information.

9. The terminal according to claim 8, wherein the communication range information further comprises at least one of:

the minimum communication distance requirement information;

the maximum communication distance requirement information;

communication distance range requirement information.

10. The terminal according to claim 8, wherein the processor is further used to execute the computer program to:

generate the mapping relationship between the communication range information and the destination address according to the communication range information, and determine the mapping relationship as the target information.

11. The terminal according to claim 10, wherein the processor is further used to execute the computer program to:

transmit the mapping relationship to the base station through a Radio Resource Control (RRC) message.

12. The terminal according to claim 8, wherein the processor is further used to execute the computer program to:

acquire the mapping relationship between the communication range information and the destination address, wherein the mapping relationship is configured or pre-configured by a network or defined in a protocol;

obtain buffer information of the destination address corresponding to the communication range information according to the mapping relationship, and determine the buffer information as the target information.

13. The terminal according to claim 12, wherein the processor is further used to execute the computer program to:

transmit the buffer information to the base station through a sidelink buffer status report.

14. The terminal according to claim 10, wherein the mapping relationship between the communication range information and the destination address comprises that one destination address is associated with at least one piece of communication range information.

15. A non-transitory computer-readable storage medium storing therein a computer program, wherein the computer program is used to be executed by a processor to implement steps of a method for processing communication range information comprising:

receiving the communication range information of a service data unit from an application layer of a sidelink user equipment;

determining target information according to the communication range information;

transmitting the target information to a base station, wherein the target information comprises a mapping relationship between the communication range information and a destination address, and the communication range information of the service data unit indicates requirement of the service data unit on a communication distance, wherein the communication range information comprises:

at least two different levels of communication distance requirement information other than minimum communication distance requirement information and maximum communication distance requirement information.

16. The non-transitory computer-readable storage medium according to claim 15, wherein the communication range information further comprises at least one of:

the minimum communication distance requirement information;

the maximum communication distance requirement information;

communication distance range requirement information.

17. The non-transitory computer-readable storage medium according to claim 15, wherein the computer program is further used to be executed by a processor to:

generate the mapping relationship between the communication range information and the destination address according to the communication range information, and determine the mapping relationship as the target information.

18. The non-transitory computer-readable storage medium according to claim 17, wherein the computer program is further used to be executed by a processor to:

transmit the mapping relationship to the base station through a Radio Resource Control (RRC) message.

19. The non-transitory computer-readable storage medium according to claim 15, wherein the computer program is further used to be executed by a processor to:

acquire the mapping relationship between the communication range information and the destination address, wherein the mapping relationship is configured or pre-configured by a network or defined in a protocol;

obtain buffer information of the destination address corresponding to the communication range information according to the mapping relationship, and determine the buffer information as the target information.

20. The non-transitory computer-readable storage medium according to claim 19, wherein the computer program is further used to be executed by a processor to:

transmit the buffer information to the base station through a sidelink buffer status report.

* * * * *